United States Patent Office 3,150,141
Patented Sept. 22, 1964

3,150,141
RESOLUTION OF RACEMIC 3-ETHYL-1,2,3,4,6,7-HEXAHYDRO - 9,10 - DIMETHOXY - 2 - OXO - 11b-BENZO (a) QUINOLIZINE
Harry Tacon Openshaw and Norman Whittaker, London, England, assignors to Burroughs Wellcome & Co. (U.S.A.) Inc., Tuckahoe, N.Y., a corporation of New York
No Drawing. Filed May 24, 1961, Ser. No. 112,191
Claims priority, application Great Britain, May 27, 1960, 18,923/60; Feb. 21, 1961, 6,401/61
3 Claims. (Cl. 260—289)

This invention relates to derivatives of 11b-benzo(a) quinolizine and their manufacture.

The naturally occurring benzo(a)quinolizine derivative (—)-emetine is an established drug in the treatment of amoebiasis. (—)-Emetine can be synthesised from the ketone 3 - ethyl-1,2,3,4,6,7-hexahydro-9,10-dimethoxy-2-oxo-11b-benzo(a)-quinolizine, but in order to obtain the desired optically active form an optical resolution entailing the loss of half the material has been a necessary step at some later stage of the synthesis.

This ketone, which has hitherto been prepared only as the racemate, should have two optical enantiomers of the configurations shown in Formulae I and II.

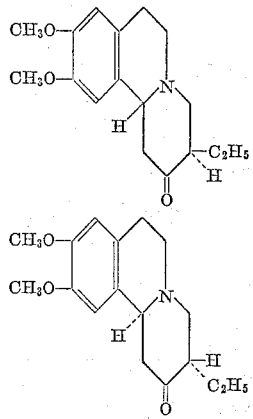

A method has now been found for obtaining either optical enantiomer of this ketone from the racemic ketone, which has the unexpected advantage of giving yields that exceed the 50% theoretically obtainable in a simple resolution. The racemic ketone is treated with one equivalent of the appropriate optical enantiomer of camphor-10-sulphonic acid in a solvent that dissolves the reagents and in which the (+)-camphor-10-sulphonate of the (+)-enantiomer of the ketone or the (—)-camphor-10-sulphonate of the (—)-enantiomer of the ketone is the least soluble component and separates, while the salt of the other enantiomer of the ketone remains in solution and is racemised by heating at a temperature insufficiently high to decompose the parent ketone but high enough to cause the racemisation (room temperature is too low). Ethyl acetate at reflux temperature or below provides convenient reaction conditions, under which the salt of the desired enantiomer slowly separates from solution, and the unwanted enantiomer remaining in solution is slowly but continuously racemised, thus providing additional amounts of the desired insoluble salt and ultimately resulting in the conversion of a large proportion of the original racemic ketone into one optically active enantiomer.

The enantiomer of 3-ethyl-1,2,3,4,6,7-hexahydro-9,10-dimethoxy-2-oxo-11b-benzo(a) quinolizine of the absolute configuration of Formula II is the (—)-enantiomer, because on condensation with (methoxycarbonylmethylene)-triphenylphosphorane and catalytic hydrogenation of the product [as described and claimed in United Kingdom patent specification No. 39,934/59 and No. 39,935/59] it gives rise to the ester (—)-3-ethyl-1,2,3,4,6,7-hexahydro-9,10-dimethoxy - 2 - methoxycarbonylmethyl - 11b-benzo(a) quinolizine. This ester is known to have the absolute configuration of Formula III, and can be converted to (—)-emetine by the method of A. R. Battersby and B. J. T. Harper [J. Chem. Soc. 1959, 1748–1753].

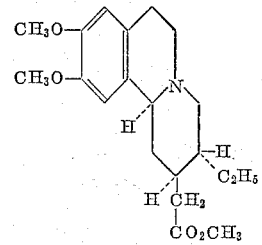

The ketone of Formula II required for the synthesis of (—)-emetine is therefore (—)-3-ethyl-1,2,3,4,6,7-hexahydro - 9,10 - dimethoxy - 2 - oxo-11b-benzo(a) quinolizine, which is obtained by treating the racemic ketone with (—)-camphor-10-sulphonic acid. The combination of conditions that causes racemisation in solution, while only the (—)-enantiomer of the ketone separates, enables the (+)-enantiomer itself to serve as starting material for obtaining the (—)-enantiomer and hence for the synthesis of emetine.

The following examples illustrate the invention. Temperatures are in degrees Celsius.

Example 1

A mixture of racemic 3-ethyl-1,2,3,4,6,7-hexahydro-9,10-dimethoxy-2-oxo-11b-benzo(a) quinolizine (10 g.), (+)-camphor-10-sulphonic acid (8.1 g.), and ethyl acetate (150 ml.) was seeded with a few crystals of the (+)-benzo(a) quinolizine (+)-camphor-10-sulphonate, and refluxed for 5 hours. [The seeds were obtained by the addition of ether to an acetone solution of the benzo(a)-quinolizine and (+)-camphor-10-sulphonic acid, followed by recrystallisation of the resulting crystals from acetone.] The resulting suspension of crystals was kept overnight at room temperature, and then filtered, giving a (+)-camphor-10-sulphonate (8.82 g.) of melting point 184–186° (afferv.) and $[\alpha]_D^{23}=38.5°$ (c.=2 in water). A solution of this salt in cold water (250 ml.) was filtered from sediment and treated gradually with an excess of aqueous ammonia. The derived crystals of the benzo(a) quinolizine base (4.50 g.) had melting point 112–117° and $[\alpha]_D^{23}=+86.5°$ (c.=1 in ethanol). This base (4.40 g.) was treated with (+)-camphor-10-sulphonic acid (3.57 g.) and ethyl acetate (66 ml.), seeded with the (+)-benzo(a) quinolizine (+)-camphor-10-sulphonate, refluxed for 30 minutes, and then set aside at room temperature for 1 hour, giving (+)-3-ethyl-1,2,3,4,6,7-hexahydro - 9,10 - dimethoxy-2-oxo-11b-benzo(a) quinolizine (+)-camphor-10-sulphonate (7.08 g.) of melting point 189–190° (efferv.) and $[\alpha]_D^{23.5}=+39.5°$ (c.=2 in water). The derived optically pure base (3.6 g.) had melting point 117–120° and $[\alpha]_D^{24.5}=+96°$ (c.=1 in ethanol), and when crystallised from light petroleum (boiling point 60–80°) formed laminated prisms of melting point 121.5–123°, $[\alpha]_D^{23}=+95°$ (c.=1 in ethanol).

The original ethyl acetate liquors were evaporated in vacuo, the residue was dissolved in water and the traces of ethyl acetate were evaporated in vacuo. The residual aqueous solution was shaken with charcoal, filtered, and then gradually basified with aqueous ammonia, giving a mixture of the (—)- and racemic benzo(a) quinolizine base (4.56 g.) of melting point 107–111° and $[\alpha]_D^{23}=-30°$ (c.=1 in ethanol).

Example 2

The reactants used in Example 1 were refluxed for 10.75 hours, and the resulting suspension of crystals was kept at room temperature for 2 hours and then filtered, giving (+)-3-ethyl-1,2,3,4,6,7-hexahydro-9,10-dimethoxy-2-oxo-11b-benzo(a) quinolizine (+)-camphor-10-sulphonate (10.99 g.), of melting point 187–188° (efferv.), $[\alpha]_D^{24.5} = 41°$ (c.=2 in water). The derived base (5.53 g.) had melting point 113–117°, $[\alpha]_D^{24.5} = +94.5°$ (c.=1 in ethanol).

No further crystallisation occurred when the ethyl acetate liquors were set aside at room temperature for 3 days, but when the liquors were concentrated to 50 ml. and refluxed for 12.5 hours, more of the (+)-benzo(a)quinolizine(+)-camphor-10-sulphonate (2.52 g.), $[\alpha]_D^{23} = +41.5°$ (c.=2 in water) was obtained. The derived base (1.12 g.) had melting point 112–117°, $[\alpha]_D^{23} = +93.5°$ (c.=1 in ethanol).

Example 3

A mixture of racemic 3-ethyl-1,2,3,4,6,7-hexahydro-9,10-dimethoxy-2-oxo-11b-benzo(a)quinolizine (10 g.), (−)-camphor-10-sulphonic acid (8.3 g.), and ethyl acetate (150 ml.) was stirred, seeded with crystals of the (−)-benzo(a)quinolizine (−)-camphor-10-sulphonate, and refluxed for 22.5 hours. The cooled suspension of crystals was set aside at room temperature overnight, filtered, and the crystals were washed with ethyl acetate, giving 14.88 g. $[\alpha]_D^{25} = -40.3°$ (c.=2 in water), of (−)-3-ethyl-1,2,3,4,6,7-hexahydro-9,10-dimethoxy-2-oxo-11b-benzo(a)quinolizine (−)-camphor-10-sulphonate. A solution of this salt in cold water (about 500 ml.) was filtered from sediment, seeded with crystals of the (−)-benzo(a)quinolizine base, and gradually basified with an excess of concentrated aqueous ammonia, giving colourless prisms of (−)-3-ethyl-1,2,3,4,6,7-hexahydro-9,10-dimethoxy-2-oxo-11b-benzo(a)quinolizine (7.64 g.), M.P. 116–120°, $[\alpha]_D^{23.5} = -96.5°$ (c.=1 in ethanol). From the aqueous liquors a further 0.6 g. of the (−)-benzo(a)quinolizine was obtained by extraction with chloroform.

When (−)-3-ethyl-1,2,3,4,6,7-hexahydro-9,10-dimethoxy-2-oxo-11b-benzo(a)quinolizine, $[\alpha]_D^{25} = -93.5°$ (c.=1 in ethanol), was condensed with (methoxycarbonyl methylene) triphenylphosphorane, the unsaturated ester (+)-3-ethyl-1,2,3,4,6,7-hexahydro-9,10-dimethoxy-2-methoxycarbonylmethylene-11b-benzo(a)quinolizine, M.P. 105.5–107°, $[\alpha]_D^{23} = +42°$ (c.=1 in methanol) was obtained, and was catalytically hydrogenated under acid conditions, giving the saturated ester (−)-3-ethyl-1,2,3,4,6,7-hexahydro-9,10-dimethoxy-2-methoxycarbonylmethyl-11b-benzo(a)quinolizine, M.P. 102–103°, $[\alpha]_D^{22.5} = -36°$ (c.=1 in methanol). The asymmetric centres in this ester have the same stereochemical configuration as in (−)-emetine, for when the ester is reacted with homoveratrylamine and the resulting homoveratrylamide is cyclised with phosphoryl chloride in benzene, (+)-O-methylpsychotrine, identical with the natural alkaloid is obtained. Reduction of the (+)-O-methylpsychotrine gives the desired (−)-emetine.

We claim:

1. A method for obtaining either optical enantiomer of the ketone 3-ethyl-1,2,3,4,6,7-hexahydro-9,-10-dimethoxy-2-oxo-11b-benzo(a)quinolizine, which comprises treating the racemic ketone with one equivalent of an optical enantiomer of camphor-10-sulphonic acid in a solvent that dissolves the reagents and in which a salt selected from the class consisting of (+)-camphor-10-sulphonate of the (+)-enantiomer of the ketone and the (−)-camphor-10-sulphonate of the (−)-enantiomer of the ketone is the least soluble component and separates, while the salt of the other enantiomer of the ketone remains in solution and is racemised by heating at a temperature insufficiently high to decompose the parent ketone but high enough to cause the racemisation, whereby a large proportion of the original racemic ketone is converted into one optically active enantiomer.

2. A method claimed in claim 1, in which the ethyl acetate is used as the solvent.

3. A method for obtaining (−)-3-ethyl-1,2,3,4,6,7-hexahydro-9,10-dimethoxy-2-oxo-11b-benzo(a)quinolizine which comprises treating the racemic ketone with one equivalent of (−)-camphor-10-sulphonic acid in ethyl acetate in which the (−)-camphor-10-sulphonate of the (−)-enantiomer of the ketone is insoluble and separates, while the salt of the other enantiomer of the ketone remains in solution and is racemised by heating at a temperature insufficiently high to decompose the parent ketone but high enough to cause the racemisation, whereby a large proportion of the original racemic ketone is converted into the desired (−)-optically active enantiomer.

References Cited in the file of this patent

UNITED STATES PATENTS

| | | |
|---|---|---|
| 2,830,993 | Brossi et al. | Apr. 15, 1958 |
| 2,967,869 | Beckman et al. | Jan. 10, 1961 |

OTHER REFERENCES

Karrer: Organic Chemistry, 2nd Edition, pp. 92–102 (1946).

Wheland: Adv. Org. Chem., 2nd Ed., pp. 237, 250 (1949).

Karrer: Org. Chem. 4th Eng. Ed., pp. 104, 701 (1950).

Evstigneeva et al.: Chem. Absts., vol. 47, p. 5949 (1953).